UNITED STATES PATENT OFFICE.

FRANK ALEX. McDERMOTT, OF WASHINGTON, DISTRICT OF COLUMBIA, AND RUTH GLASGOW, OF PITTSBURGH, PENNSYLVANIA, ASSIGNORS, BY MESNE ASSIGNMENTS, TO THE FLEISCHMANN COMPANY, A CORPORATION OF OHIO.

MANUFACTURE OF BUTYRIC ACID.

1,405,055.      Specification of Letters Patent.      Patented Jan. 31, 1922.

No Drawing. Original application filed December 22, 1915, Serial No. 68,267. Divided and this application filed December 13, 1917. Serial No. 206,963.

*To all whom it may concern:*

Be it known that we, FRANK ALEXANDER McDERMOTT and RUTH GLASGOW, citizens of the United States, residing, respectively, at Washington, in the District of Columbia, and Pittsburgh, in the county of Allegheny and State of Pennsylvania, have invented certain new and useful Improvements in the Manufacture of Butyric Acid, of which the following is a specification.

This invention relates to the manufacture, or derivation, of butyric acid, and one of our objects has been the perfecting of a method by which utilization can be made of the waste liquor by-products resulting from the manufacturing operations in distilleries, breweries, yeast and vinegar factories, and places where kindred commodities are produced, such by-products being typified by what is generally called "spent beer" or "slop."

That there may be a clear understanding of the different steps which we follow in pursuing the process which we have discovered, and of the conditions of the various materials at successive stages in the treatment of by-products, such as are above specified, we will describe the steps we have predetermined for the manufacture of this acid from the waste fluids obtained in producing yeast and alcohol.

And as the latter products may be obtained in any of the well known ways it will not be necessary, for those skilled in the art, to describe or set forth in details the course pursued in the manufacture of the yeast, and only the important steps of the series will be referred to.

First a "mash" is formed containing barley or barley sprouts, corn, and the other materials usually employed, commingled with a suitable body of water. The fluid mass comprising these is subjected to the proper temperature and the other conditions necessary for saccharification.

After saccharifying the wash is drawn off to the filtering apparatus wherein there is effected a separation of the liquid components and the materials in solution, from the solid ingredients. The fluid element after filtering and after being suitably tempered is carried to the tanks or yeast-fermentation vats. A relatively small quantity of yeast is supplied and masses of yeast cells are propagated therein, with the production of the usual materials that are always collectively formed, such as alcohol, glycerol, etc.; the yeast organisms appropriating from the original mass those sugar bodies and those parts of the proteins which they can utilize, and which are modified during the yeast fermentation.

After the culture of the yeast has reached the predetermined point the total mass from the yeast vats is withdrawn and subjected to treatment for separating the yeasty mass from the liquor, this being commonly accomplished in centrifugal machines. The solid yeast components are conducted away from the separating mechanism in one direction for final preparation, and the fluid ingredients that come from the yeast vats are taken to tanks or collectors.

This fluid mass taken from the separators comprises as its components, water, alcohol, fusel oil, aldehydes, etc. This fluid is subjected to distillation for driving off and collecting the alcohol and other light components.

The residue is the mass referred to above as the waste by-products termed "spent beer" or "slop." It consists mainly of water in relatively large volume together with a small amount of glycerol, small quantities of non-yeast-fermentable sugars, (pentoses, pentosans, etc.) proteins, simpler nitrogeneous substances, mineral salts, and lactic and succinic acids.

The relative quantities of the materials last specified will of course vary from time to time, as the materials initially used on one occasion vary more or less from those used on another, and as the conditions for each stage of the yeast manufacture in one series of steps (constituting one complete operation) differ from the conditions which characterize the corresponding stage in another operation.

But the following can be taken as an approximate statement of the percentages which can be had in mind when considering the present subject matter, namely,—

| | |
|---|---:|
| Water | 99.000 |
| Glycerol | .100 |
| Proteins and nitrogenous substances | .375 |
| Non-fermentable sugars (pentoses, etc.) | .315 |
| Lactic acid and traces of succinic acid | .200 |
| Mineral salts | .010 |
| | 100.000 |

This fluid mass (just described as that leaving the distilling apparatus) is taken off at relatively high temperature, 98° C. or thereabouts. And to attain our purposes we maintain a high temperature (90° C. and upward) during the early stages of that treatment which we have evolved and to which we subject it after the alcohol has been distilled. We have discovered that when there are proper conditions of temperature, and closely regulated conditions of acidity and alkalinity a "slop" or "spent beer" of this character can be utilized for the production of butyric acid by developing and propagating therein micro-organisms of either of a number of genera, such as *Granulobacter saccharobutyricum*, *Bacillus subtilis*, or *Bacillus boocopricus*.

None of these organisms will propagate or thrive in a medium which is not accurately and delicately regulated as to its acidity and temperature. If it be highly acidified, as for instance by the lactic acid which results in the manufacture of yeast, they will not thrive. We therefore, while the mass is still relatively highly heated (for example at 90° C. or thereabouts) neutralize the greater part of the acid component by a suitable basic reagent. For this properly prepared anhydrous lime can be used economically and with good results. The acidity is, by this, brought down close to the line of neutralization. In most cases we prefer to allow a slight amount of acid to remain. However, we add to the liquor, while still hot, as aforesaid, a slight excess of a suitable carbonate (such as calcium carbonate) which remains inert until a later stage in the process, and, therefore, at this stage, leaves the mass, as stated, slightly acid. Or, this carbonate may be added in portions during the course of fermentation.

When properly prepared the fluid mass is now ready for introducing a micro-organism of the proper genus.

The organisms for this purpose may be provided from specially formed artificial cultures; but when operating on a large scale we prefer to develop them from materials in which they abound more or less plentifully and which can be obtained more cheaply. For example malt sprouts can be used for inoculating the liquid. If *Bacillus subtilis* is to be utilized it can be developed and propagated abundantly from any of the ordinary varieties of hay.

The organisms which we develop (say of the *Granulobacter* genus) are spore formers. We introduce them to the fluid mass when it is at a high temperature, or bring them to such high heat at an early time after introducing them, and at such heat all of the organisms of the other varieties, such as the non-spore formers, are destroyed. The spores from the organisms of the variety which we desire to utilize survive, however. After a short period we lower the temperature to the point where they will germinate and a culture of the organisms can form. These become active, deriving nourishment from the glycerol and from the calcium lactate which has been formed by the neutralizing of the lactic acid with lime, and they also appropriate a considerable portion of the protein and of the non-yeast-fermentable sugars. The micro-organisms utilize these ingredients to supply materials for both cell building and energy, and during the activities in this connection produce butyric acid in addition to other products.

During this stage of butyric fermentation air should be excluded from the mass; at least air should not be admitted largely to contact with it. This can be accomplished, under ordinary circumstances, by a cover for the top of the vessel holding the mass suitably to exclude the atmosphere.

At the end of the stage of fermentation the ingredients of the fluid mass, as an entirety, can be considered as (a) water, (b) calcium butyrate, (c) some free acid, mainly butyric, (d) mineral salts, (e) such residual proteins and other nitrogenous bodies and (f) non-yeast-fermentable sugars as have escaped the action of the organisms, (g) the decomposition products that have been formed by their action upon the initial components above mentioned, together with (h) the cell structures themselves of the organisms which have been propagated during the fermentation.

The mass is still slightly acid at the close of the fermentation stage, this being due to small quantities of free butyric, succinic, etc., acids; these being supplemental to the calcium butyrate above described and which is present in relatively large quantities.

From the fluid mass thus obtained the butyric acid is separated. This can be accomplished by (a) concentrating (if necessary) the initial mass; (b) then adding a precipitant (such as copper chloride for example) suitable for forming an insoluble, or approximately insoluble precipitate; (c) the filtering, or otherwise mechanically separating, the compound from the liquor mass;

(d) decomposing this compound, as by adding a suitable acid; (e) distilling from the mass the butyric acid freed by the decomposition; and collecting the distillate.

In practicing the process thus indicated the initial liquor obtained from the butyric fermentation is rendered relatively alkaline by adding an active body, or an inactive one, or both, as found necessary, in sufficient quantity; following in this respect the procedure set forth above. Then the mass is concentrated as precipitation is more effective in a concentrated fluid.

At this stage the mass can, as above described, be regarded as comprising the following components: water, calcium butyrate, proteins, protein decomposition products, sugar, bacterial cells, and some free acid.

The concentrate is now rendered sufficiently acid (by adding a mineral acid in sufficient amount) to decompose the calcium butyrate which is present.

We then add an excess of a reagent, such as ferrous sulphate, to precipitate the proteins, the protein decomposition products, and the bacterial cells, etc.

This reagent, however, should be neutral as to butyric acid so as not to form a precipitate therewith.

After this first precipitant has finished its work the liquid mass is subjected to filtration to separate the liquid from the first precipitate.

To the liquid filtrate we then add cupric chloride in solid form, the mass being preferably stirred at this time, and cupric butyrate is formed. It is but slightly soluble in water, and after the reaction is completed the liquor is again filtered and the liquid is separated from the precipitate.

A strong acid is then added to the precipitate capable of decomposing the butyrate and forming salt with the copper, the butyric acid being freed by a strong acid, meaning one having normally a greater combining strength than butyric acid.

From the resulting mass the butyric acid is then distilled, use being made of a suitable retort, either by external heating or by means of a current of steam. The collecting and condensing devices may be of any suitable character.

The adding of the ferrous sulphate or equivalent prior to introducing the copper chloride is advantageous as it results in the removal of the proteins before they can act upon the chloride, and the latter body is reserved entirely for acting on the butyric acid.

Copper chloride is also a reagent relative to the organic materials of the protein class, and much of it would be used up in precipitating them unless they are previously removed.

While we have, above, referred to the waste liquor by-products of distilleries, yeast factories, etc., we regard such by-products merely as types of the various masses of materials from which butyric acid can be economically derived when subjected to procedure conforming to the method which we have devised.

And, again, while we have above described, somewhat in detail, specific materials or bodies, and proportions, in order that, as stated, the process may be readily understood, we do not limit ourselves thereto.

What we claim is:

1. The herein described method for separating butyric acid from a fluid mass which consists in introducing an alkali, forming a butyrate salt which is insoluble in water, then separating the said salt from the liquid mass, then adding an acid stronger than butyric acid to decompose the salt and free the butyric acid, and then distilling off the acid.

2. The herein described method for separating butyric acid from a fluid mass containing it, consisting in adding cupric chloride to the mass and causing the butyric acid to form coppr butyrate, then separating such butyrate from the mass, then decomposing the butyrate by an acid stronger than butyric acid and freeing the latter, and then separating it from the mass.

3. The herein described method for separating butyric acid from a fluid mass containing the acid or containing a butyrate, together with organic matters, which consists in introducing a precipitant adapted to render the organic materials insoluble in water, then separating the fluid mass from the precipitated materials, then forming an insoluble butyrate salt, and then decomposing the salt and separating therefrom the butyric acid.

4. The herein described method for separating butyric acid from a fluid mass containing a butyrate salt and organic matter, which consists in acidifying the mass and decomposing the butyrate salt, introducing ferrous sulphate and precipitating the organic matter, then separating the liquor from the precipitated materials, forming an insoluble butyrate salt, and then decomposing the butyrate and separating the butyric acid.

In testimony whereof, we hereunto set our hands this 9th day of October, 1917.

F ALEX. McDERMOTT.
RUTH GLASGOW.